United States Patent [19]

Siemonsen et al.

[11] E Re. 28,862

[45] Reissued June 15, 1976

[54] EASY OPEN MEANS FOR BOTTLES AND THE LIKE

[75] Inventors: Frederik A. Siemonsen; Alfred L. Garriques, both of Richmond, Va.

[73] Assignee: Owens-Illinois, Inc., Toledo, Ohio

[22] Filed: Aug. 18, 1971

[21] Appl. No.: 172,735

Related U.S. Patent Documents

Reissue of:

[64] Patent No.: 3,462,036
Issued: Aug. 19, 1969
Appl. No.: 587,170
Filed: Oct. 17, 1966

[52] U.S. Cl. ..... 215/255
[51] Int. Cl.[2] ..... B65D 41/32
[58] Field of Search ..... 215/42, 46.5, 39, 255; 220/54

[56] References Cited

UNITED STATES PATENTS

| | | | |
|---|---|---|---|
| 2,085,200 | 6/1937 | Ljungstrom et al. | 220/54 |
| 2,218,040 | 10/1940 | Hutaff | 215/46 A |
| 2,571,898 | 10/1951 | Kondakow et al. | 215/46 A |
| 3,310,192 | 3/1967 | Edwards et al. | 215/46 A |
| 3,349,949 | 10/1967 | Brown et al. | 220/54 |

FOREIGN PATENTS OR APPLICATIONS

| | | | |
|---|---|---|---|
| 658,870 | 10/1951 | United Kingdom | 220/42 B |
| 701,939 | 1/1954 | United Kingdom | 215/46 |

*Primary Examiner*—George T. Hall
*Attorney, Agent, or Firm*—J. R. Nelson

[57] ABSTRACT

This disclosure relates to a bottle cap construction wherein a tear section is defined by score means in the bottle cap construction so that the tear section is initially integral with the remainder of the bottle cap throughout the entire juncture of the tear section with the remainder of the bottle cap. The tear section has at least one edge thereof extending from the top portion of the bottle cap to the free edge of the rim portion that is utilized to crimp the bottle cap to the open end of the bottle, a ring pull tab being secured to the tear section at the top portion of the bottle cap to facilitate the pulling of at least one edge of the tear section from the closure member to open the bottle.

29 Claims, 24 Drawing Figures

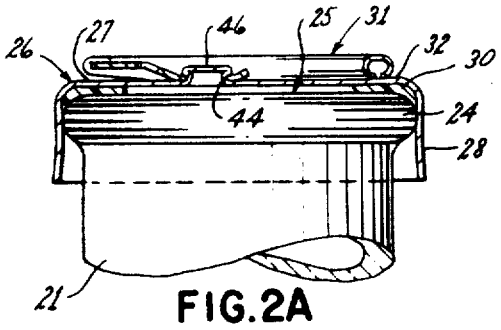
FIG.2A
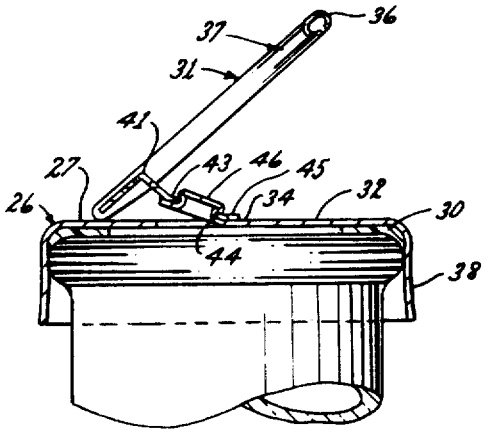
FIG.3A
FIG.5
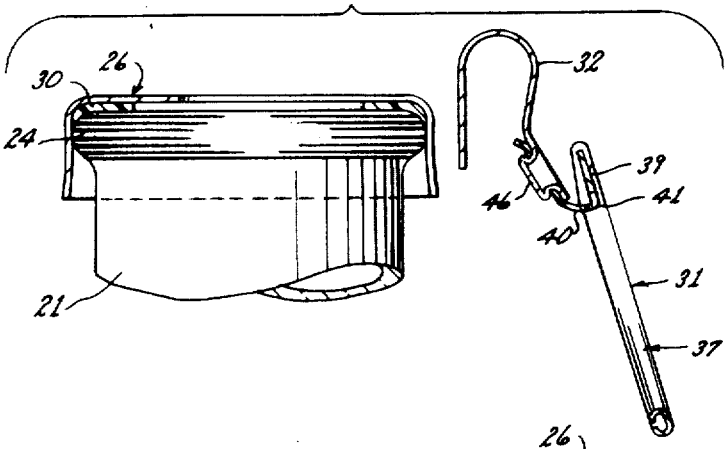
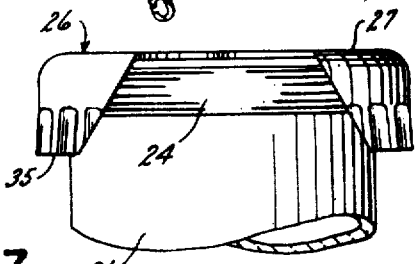
FIG.6
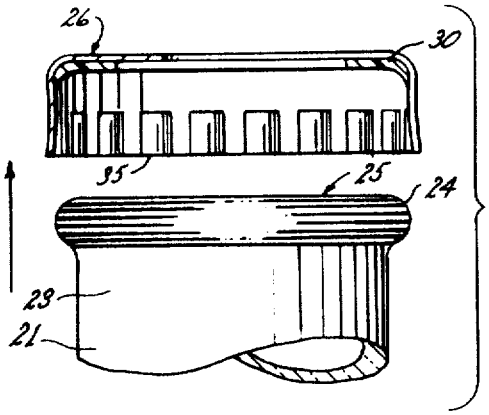
FIG.7

EASY OPEN MEANS FOR BOTTLES AND THE LIKE

Matter enclosed in heavy brackets [ ] appears in the original patent but forms no part of this reissue specification; matter printed in italics indicates the additions made by reissue.

This invention relates to an improved easy open means for a closure member utilized to close the open end of a bottle-like container or the like.

It is well known that many beverage companies have been merchandising their product in aluminum containers or the like having the upper end closure thereof provided with a tear-out portion interconnected to a pull tab means so that the ultimate consumer can grasp the pull tab means and sever the tear-out portion from the end wall of the container to provide an opening therein for subsequent product dispensing purposes.

However, such cylindrical container end closure means and pull tab forming mechanism are not applicable for use on the relatively small crown type end closures or caps normally utilized with beverage bottles and the like so that no satisfactory easy open means have been provided for the conventional bottle type beverage container whereby auxiliary bottle cap openers must be utilized by the ultimate consumer to open such bottle-like beverage containers.

According to the teachings of this invention, however, easy open means are provided for the conventional crown type end closures for bottle-like containers or the like wherein the ultimate consumer can open such end closure and remove the same from the bottle-like container in an easy and effective manner without requiring an auxiliary opening member.

Therefore, it is an object of this invention to provide an improved easy open means for a bottle-like container or the like, the easy open means of this invention having one or more of the novel features set forth above or hereinafter shown or described.

Another object of this invention is to provide an improved end closure having easy open means.

Other objects, uses and advantages of this invention are apparent from a reading of this description, which proceeds with reference to the accompanying drawings forming a part thereof and wherein:

FIG. 2A is an enlarged, fragmentary, cross-sectional view taken substantially on line 2A—2A of FIG. 2.

FIG. 3A is a view similar to FIG. 2A and is taken substantially on line 3A—3A of FIG. 3.

FIG. 5 is a view similar to FIG. 2A and illustrates the tear-out section being completely removed from the end closure of this invention.

FIG. 6 is a fragmentary, side view of the end closure and container of FIG. 5 after the tear-away section thereof has been removed.

FIG. 7 is a view similar to FIG. 5 and illustrates the last step in the method for completely opening the container of FIG. 1.

Figure 1:
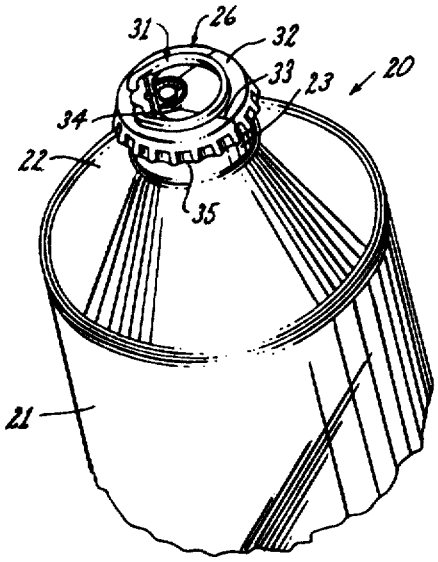
FIG. 1 is a fragmentary, top perspective view of the improved bottle-like container means of this invention.

While the various features of this invention are hereinafter described and illustrated as being particularly adaptable to provide easy open means for a beverage bottle or the like, it is to be understood that the various features of this invention can be utilized singly or in any combination thereof to provide easy open means for other types of products.

Therefore, this invention is not to be limited to only the embodiments illustrated in the drawings, because the drawings are merely utilized to illustrate one of the wide variety of uses of this invention.

Referring now to FIG. 1, one embodiment of the improved container means of this invention is generally indicated by the reference numeral 20 and comprises a conventional glass-type bottle 21 of the returnable or non-returnable type having an upper end 22 provided with a conventional neck 23 terminating at its upper end in an annular bead 24 surrounding the open end 25 thereof and through which the desired product, such as a beverage or the like, is disposed within the bottle 21 and through which the product is subsequently dispensed by the ultimate consumer.

A substantially conventional crown type end closure or bottle cap 26 of this invention is adapted to be disposed over the neck portion 23 of the bottle 22 to seal the product means therein by conventional bottle closing mechanism.

In particular, the conventional end closure 26 includes a substantially flat top portion 27 having a depending peripheral flange means or rim means 28 adapted to depend below the annular bead 24 of the bottle 21 and through the corrugation means 29 and be inwardly bent or crimped to hold the end closure 26 to the annular bead 24 of the bottle 21 so that the product means will be completely hermetically sealed in the bottle 21.

In order to perfect the hermetic seal between the end closure 26 and the open end 25 of the bottle 21, a suitable sealing gasket means 30 is carried by the end closure 26 and is adapted to be compressed against the annular bead 24 of the bottle 21 in a conventional manner.

In order to convert the conventional end closure 26 to the easy open means of this invention, a ring-like pull tab means 31 is provided and is interconnected to a tear section 32 of the end closure 26 in a manner hereinafter set forth so that when the pull tab means 31 is utilized in a manner hereinafter described to completely separate the tear section 32 from the end closure 26, the remaining portion of the end closure 26 on the bottle 21 can be readily removed therefrom by hand in the manner illustrated in FIG. 7 to fully open the bottle 21 without requiring a conventional bottle opener or the like.

In particular, the end closure or bottle cap 26 is formed from metallic material, such as aluminum-containing metallic material or the like and the tear section 32 thereof is defined by score means 33 so constructed and arranged that the same defines a substantially triangular tear section 32 having its apex 34 disposed substantially centrally in the flat top wall 27 of the end closure 26 with the score means 33 diverging away from each other as they extend toward the depending side wall means or peripheral flange 28 of the end closure 26 and extend downwardly along the side wall or flange 28 of the end closure 26 to the free end 35 thereof.

The ring-like pull tab means 31 of this invention is fully illustrated in FIGS. 8–11 and comprises metallic material, such as aluminum-containing metallic material or the like, suitably formed to defined an annular portion 36 having a substantially circular cross-sectional configuration and providing a finger-receiving opening 37 for a purpose hereinafter described, the annular portion 36 being defined in part by a stepped flange means 38 having a front portion 39 interconnected to an angularly disposed portion 40 at an edge or fold line 41 suitably weakened by an aperture 42 passing therethrough for a purpose hereinafter described. The angular portion 40 is interconnected to an inwardly directed fastening tab 43 having an opening 44 passing therethrough and being substantially surrounded by an upwardly flared peripheral section 45 to strengthen the section 43 for a purpose hereinafter described.

In order to secure the ring-like pull tab means 31 of this invention to the tear section 32 of the end closure 26, the tear section 32 has an integral rivet-like portion 46 upwardly formed therefrom and passing through the opening 44 of the pull tab means 31 in the manner illustrated in FIG. 2A to be subsequently flattened so tha the rivet portion 46 holds the pull tab means 31 thereto as fully illustrated in FIG. 2A.

When the pull tab means 31 is secured to the end closure 26 in the manner previously described, it can be seen that the pull tab means 31 is disposed flush against the flat portion 27 of the end closure 26 to provide a compact arrangement so that the assembled pull tab means 31 and end closure 26 can be utilized with existing bottle cap facilities at breweries or other bottling plants and can be used at the same high speed requiring only minor modifications thereof.

After the assembled ring-like pull the tab means 31 and end closure 26 of this invention have been assembled together in the manner previously described, the same can be utilized to seal closed the open end 25 of the product filled bottle 21 in the manner previously described whereby the depending flange 28 of the end closure 26 is crimped around the annular bead 24 of the bottle 21 in the previously described conventional manner to hermetically seal the product means within the bottle 21.

Figure 3:
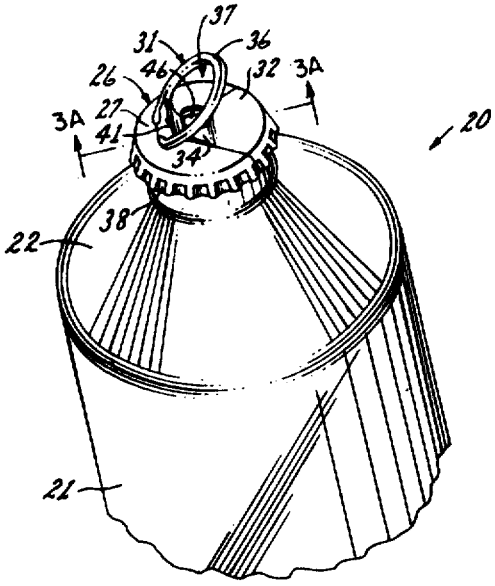
FIG. 3 is a view similar to FIG. 1 and illustrates the initial step in opening the beverage container of FIG. 1.
Figure 4:
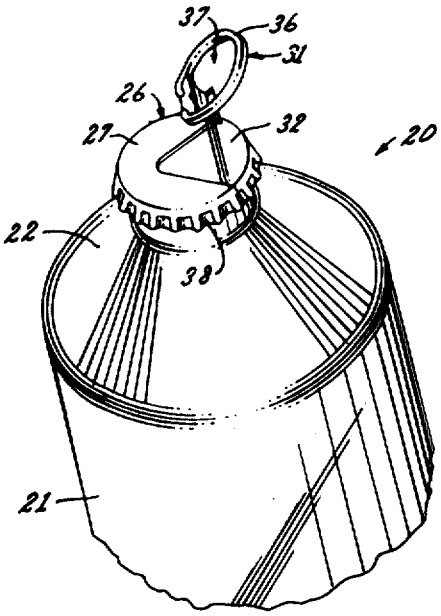
FIG. 4 is a view similar to FIG. 3 and illustrates another step in the end closure opening method of this invention.
Figure 8:
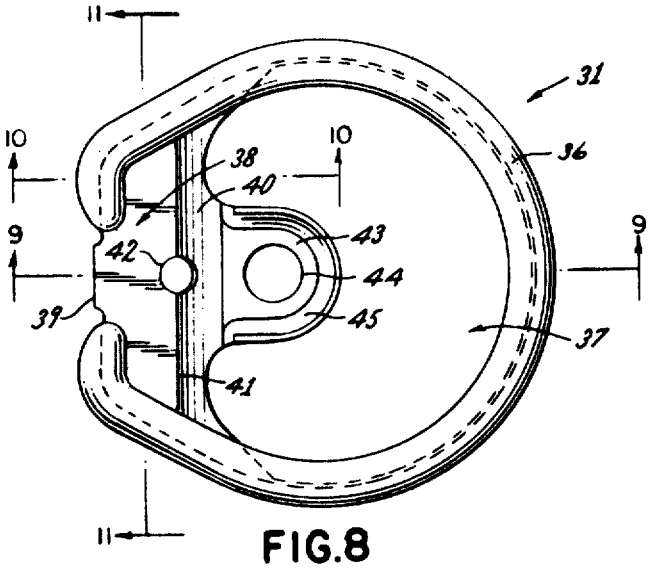
FIG. 8 is an enlarged top view of the ring pull tab means of this invention utilized with the container of FIG. 1.
Figure 9:
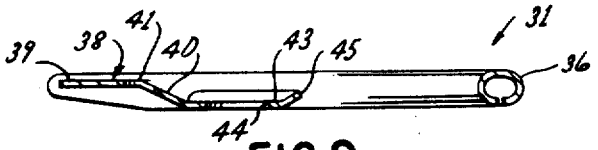
FIG. 9 is a cross-sectional view taken on line 9—9 of FIG. 8.
Figure 10:
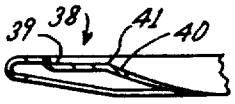
FIG. 10 is a fragmentary, cross sectional view taken on line 10—10 of FIG. 8.
Figure 11:
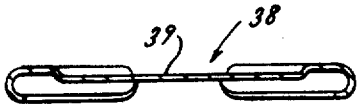
FIG. 11 is a cross-sectional view taken on line 11—11 of FIG. 8.

When the ultimate consumer desires to open the container means 20 of this invention, the ultimate consumer inserts a finger nail or the like under the right-hand portion of the pull tab means 31 and lifts upwardly on the same in the manner illustrated in FIGS. 3 and 3A whereby the left-hand portion of the annular means 36 of the pull tab means 31 begins to fulcrum against the top wall 27 of the end closure 26 outboard of the apex 34 of the tear section 32 to pull upwardly on the rivet means 46 of the tear section 32 and cause the apex 34 thereof to completely separate from the end closure 26 in the manner illustrated in FIGS. 3 and 3A.

Thus, it can be seen that a relatively small force is required to lift upwardly on the pull tab means 31 to dispose the same in the position illustrated in FIGS. 3 and 3A because of the lever-like arrangement of the pull tab means 31 and because the flange means 38 of the pull tab means 31 readily bends at the line 41 thereof to cause an upward lifting force on the rivet means 46 to separate the apex part 34 of the tear section 32 from the wall 27 of the end closure 26, the flared annular surrounding means 45 of the securing part 43 of the pull tab means 31 fully reinforcing the opening 44 thereof to prevent the section 43 from being torn from the rivet means 46 in a premature manner.

With the pull tab means 31 now disposed in the position illustrated in FIGS. 3 and 3A, the ultimate consumer can now insert a finger through the finger-receiving opening 37 thereof and pull the pull tab means 31 to the right in FIGS. 3 and 3A and then downwardly in a simple motion in the manner illustrated in FIG. 5 whereby the tear section 32 will completely separate from the end closure 26 as illustrated in FIGS. 5 and 6. The holding force of the inwardly crimped side wall or flange 28 of the end closure 26 around the annular bead 24 of the bottle 21 is now substantially relieved by the removed tear section 32 in a manner to permit the ultimate consumer to merely push upwardly on the remaining portion of the end closure 26 at the free edge 35 thereof in the manner illustrated in FIG. 7 so that the end closure 26 will be readily separated from the bottle 21 in any easy finger removing manner.

Thus, it can be seen that the pull tab means 31 and tear section 32 of this invention readily converts the conventional crown type end closure or bottle cap 26 to an easy open means in a simple and effective manner so that the ultimate consumer can readily open the container means 20 of this invention with a simple finger operation without requiring a conventional bottle cap opener or the like. However, it can further be seen that if the ultimate consumer does not utilize the easy open means 31, 32 of this invention, the bottle cap 26 can be opened in the conventional manner by a bottle cap opener because the pull tab means 31 is disposed snugly against the flat top wall 27 of the end closure 26 and will not interfere with the conventional opening means for the container 20, if desired.

Figure 2:
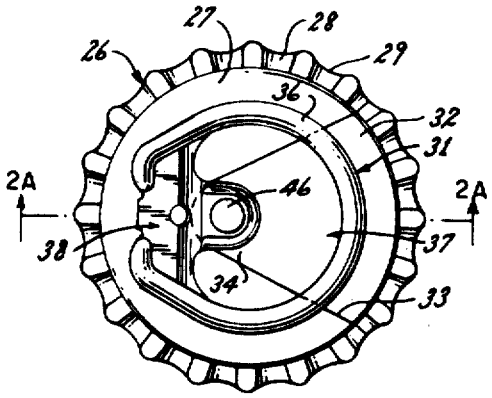
FIG. 2 is an enlarged top view of the end closure utilized with the bottle-like container of FIG. 1.

Further, it can readily be seen that in initially lifting the pull tab means 31 from the position illustrated in FIG. 2A to the position illustrated in FIG. 3A in the manner previously described, the apex means 34 of the tear section 32 is completely severed from the flat wall 27 of the end closure 26 by an effective lever-like arrangement so that the subsequent pulling of the tear section 32 from the end closure 26 in the manner illustrated in FIG. 5 requires relatively little force because it is well known that in tear sections the greatest force is required in initially forming a separation between the tear section and the remainder of the wall thereof.

For example, in the past, such initial separation of an end portion of the tear section from the remaining wall of the end closure carrying the same required a pulling action by the ultimate consumer, whereas in this invention, the initial separation is easily provided by a simple lever-like arrangement so that the fulcruming action of the pull tab means 31 relative to the end closure 26 effects the initial separation of the tear section 32 from the end closure 26 without requiring a pulling action as in the past.

While the tear section 32 for the container construction 20 has been previously described as being completely removable from the closure member 26 during the bottle opening operation, it is to be understood that such tear section could remain secured to the closure member while still effecting easy opening thereof in combination with the ring-like pull tab means.

For example, another embodiment of this invention is illustrated in FIGS. 12–22 wherein the various parts of the container construction or means 20A that are substantially identical to like parts of the container means 20 are indicated by the reference numerals followed by the reference letter A.

Figure 12:
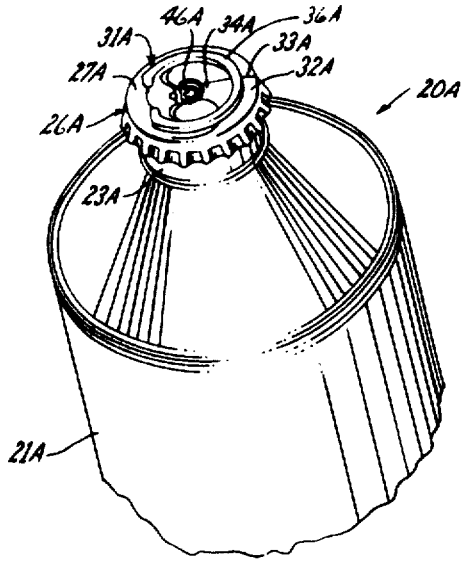
FIG. 12 is a view similar to FIG. 1 and illustrates another embodiment of this invention.

As illustrated in FIG. 12, the container means 20A comprises the conventional glass type bottle 21A having the end closure or cap 26A of this invention secured to the neck porition 23A in the manner previously described to substantially hermetically seal a desired product within the bottle 21A.

The end closure member 26A includes a tear section 32A defined therein by score means 33A with one end 34A of the tear section 32A being secured to the ring pull tab means 31A by the integral rivet means 46A previously described.

Figure 18:
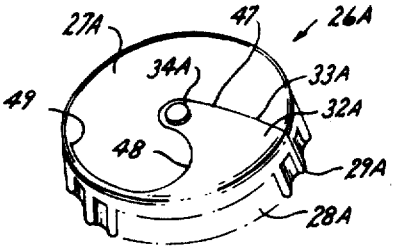
FIG. 18 is a perspective view of the closure member of FIG. 12 without the pull ring thereon.
Figure 19:
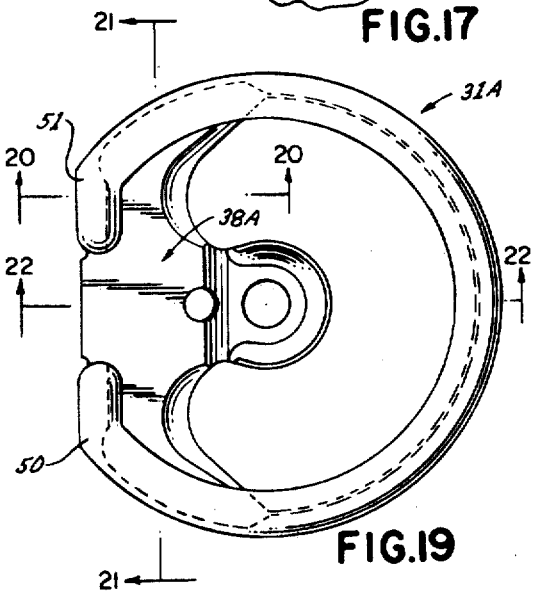
FIG. 19 is an enlarged top view of the pull ring for the container of FIG. 12.

However, it can readily be seen in FIG. 18 that the closure member or cap 26A has the tear section 32A defined by the score means 33A in such a manner that one edge means 47 of the tear section 32A extends from the end 34A of the tear section 32A across the top portion 27A and down the rim portion 28A to the free end 29A thereof in substantially the same manner as one of the opposed edge of the previously described tear section 32. However, the other edge means 48 of the tear section 32A extends from the end 34A thereof toward the rim portion 28A and then loops back or reversely turns to run substantially concentric with the outer periphery of the top portion 27A to terminate at a point 49 as illustrated in FIG. 18 for a purpose hereinafter described.

Figure 22:
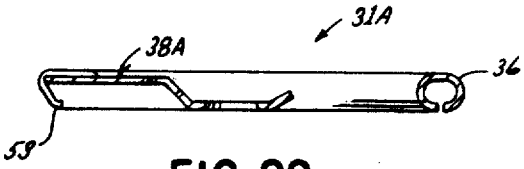
FIG. 22 is a cross-sectional view taken on line 22—22 of FIG. 19.
Figure 20:
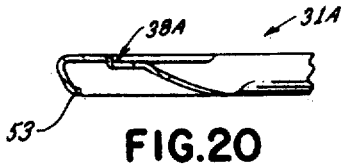
FIG. 20 is a fragmentary cross-sectional view taken on line 20—20 of FIG. 19.
Figure 21:
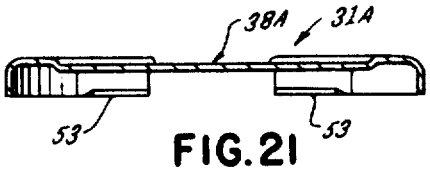
FIG. 21 is a cross-sectional view taken on line 21—21 of FIG. 19.

The ring pull tab means 31A for the container means 20A is substantially indentical to the ring pull tab means 31 previously except that the stepped flange portion 38A thereof has the opposed ends 50 and 51 curled thereunder to respectively define fulcrum point means 53 as illustrated in FIGS. 20 and 22 to fulcrum on the top portion 27A of the end closure 26A during the opening operation of the container means 20A now to be described.

Figure 13:
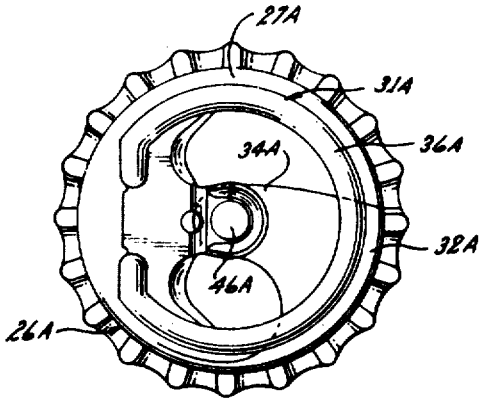
FIG. 13 is an enlarged top view of the container of FIG. 12.

As illustrated in FIGS. 12 and 13, the ring pull tab means 31A is disposed substantially concentrically upon the top portion 27A of the end closure 26A and is firmly attached to the end 34A of the tear section 32A by the previously described integral rivet means 46A. However, when the ultimate consumer desires to open the container means 20A with the ring pull tab means 31A, the ultimate consumer lifts upwardly on the right-hand end of the annular portion 36A of the ring pull tab means 31A in the manner illustrated in FIG. 14 to cause the fulcrum points 53 of the ring pull tab means 31A to fulcrum against the top portion 27A of the end closure 26A and raise and separate the inner end 34A of the tear section 32A in the manner previously described.

Figure 14:
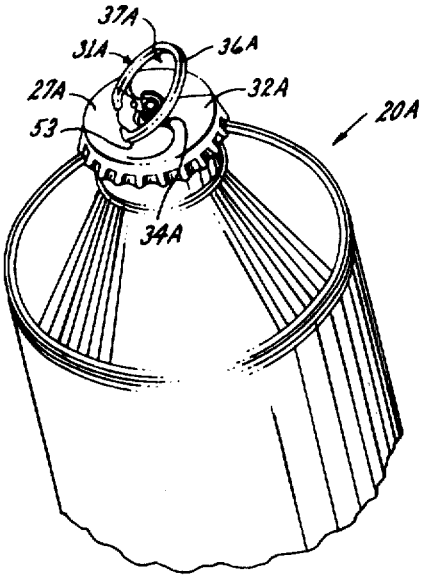
FIG. 14 is a view similar to FIG. 12 and illustrates the pull ring in its initially raised position.
Figure 15:
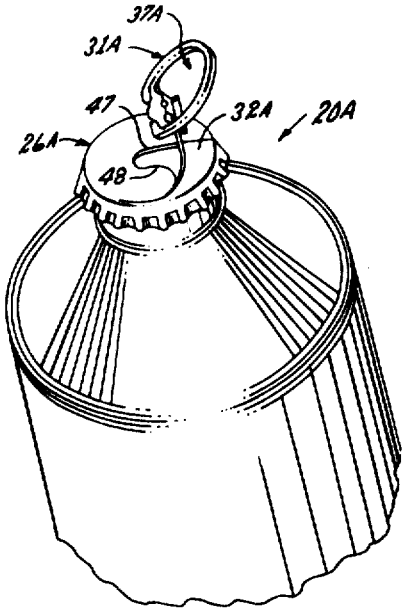
FIGS. 15, 16 and 17 are views similar to FIG. 14 and illustrate other steps in the method for opening the container of FIG. 12.

With the ring pull tab means 31A disposed in the raised position illustrated in FIG. 14, the ultimate consumer can now fully insert a finger into the finger receiving opening 37A of the ring pull tab means 31A and pull outwardly and upwardly on the same in the manner illustrated in FIG. 15 to cause the tear section 32A to begin to separate from the remainder of the end closure 26A along the opposed edges 47 and 48 thereof in the manner illustrated in FIG. 15.

Figure 16:
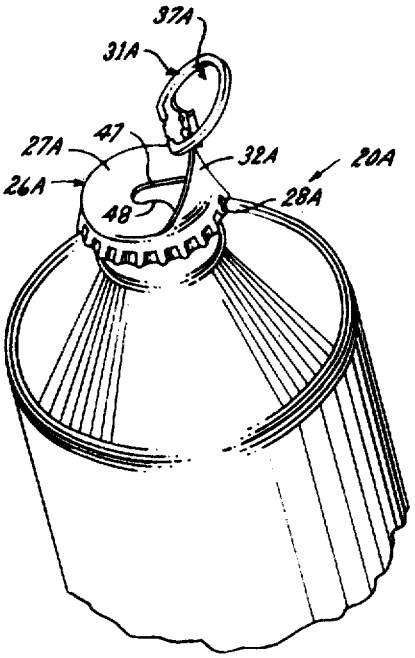
Figure 17:
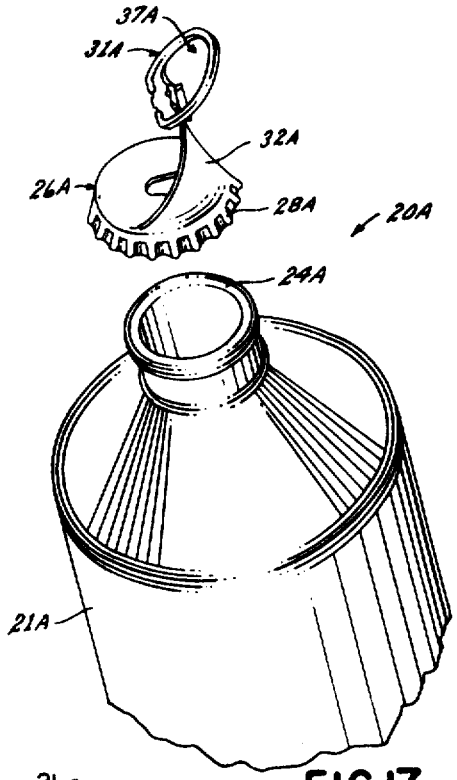

Further outward movement of the ring pull tab means 31A causes the edge means 47 of the tear section 32A to tear or separate completely from the end closure 26A along the top portion 27A and rim portion 28A thereof in the manner illustrated in FIG. 16 and to begin to tear along the reversely turned part of the edge means 48 until a particular position is reached to completely relieve the holding tension of the rim portion 28A of the end closure 26A around the beaded upper end 24A of the bottle 21A so that the entire end closure 26A is completely pulled therefrom in the manner illustrated in FIG. 17.

Thus, it can be seen that the tear section 32A in the embodiment of FIGS. 12–22 remains secured to the end closure 26A after the tear section 32A has been partially separated from the remainder of the end closure 26A in an amount sufficient to completely relieve the holding tension of the crimped rim portion 28A around the bead 24A of the bottle 21A so that the entire end closure 26A and attached tear section 32A can be removed as a unit from the bottle 21A in substantially one simple pulling motion by the ultimate consumer.

This simply pulling motion is effected by the ultimate consumer merely placing one finger in the finger receiving opening 37A of the ring pull tab means 31A in the manner previously described whereby no sharp or ragged edges on the end closure 26A will be engaged by the hands of the ultimate consumer during the previously described easy opening of the container means 20A.

Therefore, it can be seen that the end closure 26 in the embodiment of FIG. 1 has the tear section 32 thereof completely removed during the easy opening thereof whereas the tear section 32A in the end closure 26A of the embodiment of FIG. 12 remains secured to the remainder of the end closure 26A during the easy opening of the container means 20A.

Therefore, it can be seen that this invention not only provides an improved easy open means for bottle-like container means or the like, but also this invention provides an improved end closure means for such a container means or the like.

While the form of the invention now preferred has been disclosed as required by the statutes, other forms may be used, all coming within the scope of the claims which follow.

What is claimed is:

1. In combination, a container having an open end for dispensing product means disposed in said container, and a [ one-piece ] closure member secured to said open end of said container to close said open end, said closure member having a top portion disposed over said open end and a depending peripheral rim portion disposed around said container at said open end thereof to secure said closure member to said container, said closure member having a tear section integral therewith throughout the entire juncture of said tear section with the remainder of said closure member and provided with two edges that join together at adjacent ends thereof to define one end of said tear section substantially at the central part of said top portion with at least one edge thereof extending from said top portion to the free edge of said rim portion and with the other edge always [progressively] diverging away from said one edge from said adjacent ends thereof to the other ends thereof, and a ring pull tab means secured to said tear section at said top portion of said closure member and having a finger-receiving opening passing therethrough to facilitate the pulling of at least said one edge of said tear section from said closure member.

2. A combination as set forth in claim 1 wherein said juncture between said tear section and said remainder of said closure member is defined by score line means in said closure member.

3. A combination as set forth in claim 1 wherein said other edge of said tear section extends from said top portion of said closure member and terminates short of said free edge of said rim portion whereby said tear section remains integral with said closure member even though said edges have been separated from said closure member to permit pulling of said closure member from said container by said ring pull tab means.

4. A combination as set forth in claim 3 wherein said other edge of said tear section extends toward said rim portion from said one end of said tear section and reversely turns adjacent thereto along said top portion of said closure member.

5. A combination as set forth in claim 1 wherein said tear section has a substantially triangular configuration.

6. A combination as set forth in claim 5 wherein said tear section has its apex secured to said pull tab means with its base being defined at said free edge of said rim portion whereby said tear section can be completely separated from said closure member by said ring pull tab means.

7. A combination as set forth in claim 1 wherein said ring pull tab means is initially disposed against and within the outer periphery of said top portion of said closure member.

8. A [ one-piece ] closure member for a container having an open end for dispensing product means disposed in said container, said closure member having a top portion adapted to be disposed over said open end and a depending peripheral rim portion adapted to be disposed around said container at said open end thereof to secure said closure member to said container, said closure member having a tear section integral therewith throughout the entire juncture of said tear section with the remainder of said closure member and provided with two edges that join together at adjacent ends thereof to define one end of said tear section substantially at the central part of said top portion with at least one edge thereof extending from said top portion to the free edge of said rim portion and with the other edge always [ progressively ] diverging away from said one edge from said adjacent ends thereof to the other ends thereof, and a ring pull tab means secured to said tear section at said top portion of said closure member and having a finger-receiving opening passing therethrough to facilitate the pulling of at least said one edge of said tear section from said closure member.

9. A closure member as set forth in claim 8 wherein said juncture between said tear section and said remainder of said closure member is defined by score line means in said closure member.

10. A combination as set forth in claim 8 wherein said other edge of said tear section extends from said top portion of said closure member and terminates short of said free edge of said rim portion whereby said tear section remains integral with said closure member even though said edges have been separated from said closure member to permit pulling of said closure member from said container by said ring pull tab means.

11. A combination as set forth in claim 10 wherein said other edge of said tear section extends toward said rim portion from said one end of said tear section and reversely turns adjacent thereto along said top portion of said closure member.

12. A closure member as set forth in claim 8 wherein said tear section has a substantially triangular configuration.

13. A closure member as set forth in claim 12 wherein said tear section has its apex secured to said pull tab means with its base being defined at said free edge of said rim portion whereby said tear section can be completely separated from said closure member by said ring pull tab means.

14. A closure member as set forth in claim 8 wherein said ring pull tab means is initially disposed against and within the outer periphery of said top portion of said closure member.

15. A [ one-piece ] closure member for a container having an open end for dispensing product means disposed in said container, said closure member having a top portion adapted to be disposed over said open end and a depending peripheral rim portion adapted to be disposed around said container at said open end thereof to secure said closure member to said container, said closure member having a tear section integral therewith throughout the entire juncture of said tear section with the remainder of said closure member and provided with two edges that join together at adjacent ends thereof to define one end of said tear section [ substantially at the central part of said top portion ] with at least one edge thereof extending from said top portion to the free edge of said rim portion and with the other edge always [ progressively ] diverging away from said one edge from said adjacent ends thereof to the other ends thereof.

16. A closure member as set forth in claim 15 wherein said juncture between said tear section and said remainder of said closure member is defined by score line means in said closure member.

17. A closure member as set forth in claim 15 wherein said other edge of said tear section extends from said top portion of said closure member and terminates short of said free edge of said rim portion whereby said tear section remains integral with said closure member even though said edges have been separated from said closure member.

18. A closure member as set forth in claim 17 wherein said other edge of said tear section extends toward said rim portion from said one end of said tear section and reversely turns adjacent thereto along said top portion of said closure member.

19. A closure member as set forth in claim 15 wherein said tear section has a substantially triangular configuration.

20. A closure member as set forth in claim 19 wherein said tear section has its apex defined at said top portion with its base being defined at said free edge of said rim portion whereby said tear section can be completely separated from said closure member.

*21. In combination a container having an open end for dispensing product means disposed in said container, and a closure member secured to said open end of said container to close said open end, said closure member having a top portion disposed over said open end and a depending peripheral rim portion disposed around said container at said open end thereof to secure said closure member to said container, said closure member having a tear section integral therewith throughout the entire juncture of said tear section with the remainder of said closure member and provided with two edges that join together at adjacent ends thereof to define one end of said tear section with at least one edge thereof extending from said top portion to the free edge of said rim portion and with the other edge always diverging away from said one edge from said adjacent ends thereof to the other ends thereof, and a ring pull tab means secured to said tear section at said top portion of said closure member and having a finger receiving opening passing therethrough to facilitate the pulling of at least said one edge of said tear section from said closure member.*

*22. A combination as set forth in claim 21 wherein said other edge of said tear section extends from said top portion of said closure member and terminates short of said free edge of said rim portion whereby said tear section remains integral with said closure member even though said edges have been separated from said closure member to permit pulling of said closure member from said container by said ring pull tab means.*

*23. A closure member for a container having an open end for dispensing product means disposed in said container, said closure member having a top portion adapted to be disposed over said open end and a depending peripheral rim portion adapted to be disposed around said container at said open end thereof to secure said closure member to said container, said closure member having a tear section integral therewith throughout the entire juncture of said tear section with the remainder of said closure member and provided with two edges that join together at adjacent ends thereof to define one end of said tear section with at least one edge thereof extending from said top portion to the free edge of said rim portion and with the other edge always diverging away from said one edge from said adjacent ends thereof to the other ends thereof, and a ring pull tab means secured to said tear section at said top portion of said closure member and having a finger-receiving opening passing therethrough to facilitate the pulling of at least said one edge of said tear section from said closure member.*

*24. A combination as set forth in claim 23 wherein said other edge of said tear section extends from said top portion of said closure member and terminates short of said free edge of said rim portion whereby said tear section remains integral with said closure member even though said edges have been separated from said closure member to permit pulling of said closure member from said container by said ring pull tab means.*

*25. A combination as set forth in claim 21 in which said closure member has a sealing gasket.*

*26. A closure member as set forth in claim 17 which further has a sealing gasket.*

*27. A closure member as set forth in claim 17 made of metal containing aluminum.*

*28. A closure member as set forth in claim 24 which further has a sealing gasket.*

*29. A closure member as set forth in claim 24 made of metal containing aluminum.*

* * * * *